(12) United States Patent
Mehan et al.

(10) Patent No.: US 9,496,070 B2
(45) Date of Patent: Nov. 15, 2016

(54) MULTI-LAYER INSULATED CONDUCTOR HAVING IMPROVED SCRAPE ABRASION RESISTANCE

(71) Applicant: TYCO ELECTRONICS CORPORATION, Berwyn, PA (US)

(72) Inventors: Ashok K. Mehan, Union City, CA (US); Paul Cabrey, San Jose, CA (US)

(73) Assignee: TYCO ELECTRONICS CORPORATION, Berwyn, PA (US)

( * ) Notice: Subject to any disclaimer, the term of this patent is extended or adjusted under 35 U.S.C. 154(b) by 565 days.

(21) Appl. No.: 13/737,049

(22) Filed: Jan. 9, 2013

(65) Prior Publication Data

US 2014/0190724 A1 Jul. 10, 2014

(51) Int. Cl.
| | |
|---|---|
| *H01B 3/42* | (2006.01) |
| *H01B 3/44* | (2006.01) |
| *B32B 27/08* | (2006.01) |
| *B32B 27/28* | (2006.01) |
| *B32B 27/32* | (2006.01) |
| *H01B 3/36* | (2006.01) |
| *H01B 7/02* | (2006.01) |
| *H01B 7/00* | (2006.01) |
| *B05D 5/12* | (2006.01) |
| *B29C 47/88* | (2006.01) |
| *B01J 19/08* | (2006.01) |

(52) U.S. Cl.
CPC .............. *H01B 3/427* (2013.01); *B32B 27/08* (2013.01); *B32B 27/288* (2013.01); *B32B 27/322* (2013.01); *H01B 3/36* (2013.01); *H01B 3/445* (2013.01); *H01B 7/0275* (2013.01)

(58) Field of Classification Search
CPC .............. H01B 7/00; B29C 47/88; B01J 19/08
USPC ........................ 174/120 SR; 264/211.12, 473
See application file for complete search history.

(56) References Cited

U.S. PATENT DOCUMENTS

| | | | | |
|---|---|---|---|---|
| 3,168,417 A | * | 2/1965 | Smith, Jr. ............ | C09D 179/08 |
| | | | | 174/120 R |
| 3,269,862 A | * | 8/1966 | Lanza ...................... | B05D 7/20 |
| | | | | 174/120 SR |

(Continued)

FOREIGN PATENT DOCUMENTS

| | | | |
|---|---|---|---|
| GB | 2471322 A | * 12/2010 | ............... B32B 5/16 |
| WO | 9831022 A1 | 7/1998 | |

(Continued)

OTHER PUBLICATIONS

Calmont wire and cable AWG chart included in file wrapper.*

(Continued)

*Primary Examiner* — Michael F McAllister

(57) ABSTRACT

An insulated conductor and method for making it are disclosed. The insulated conductor includes an elongate conductor and a multi-layer insulation system. The multi-layer insulation system has a first insulating layer including an aromatic thermoplastic material overlying the elongate conductor and a second insulating layer including a perfluoropolymer adjacent the first insulating layer. The first and second insulating layers are each applied to a thickness such that the multi-layer insulation system exhibits a scrape abrasion resistance that is significantly greater than sum of the scrape abrasion resistance of the first and second insulating layers individually at that thickness.

19 Claims, 2 Drawing Sheets

(56) References Cited

U.S. PATENT DOCUMENTS

| | | | | |
|---|---|---|---|---|
| 3,607,387 | A * | 9/1971 | Lanza | B32B 27/00 174/110 N |
| 5,725,953 | A * | 3/1998 | Onishi et al. | 428/383 |
| 5,731,008 | A * | 3/1998 | Morrow | A23L 1/097 205/464 |
| 5,731,088 | A * | 3/1998 | La Court | B32B 27/08 428/421 |
| 6,359,230 | B1 * | 3/2002 | Hildreth | H01B 7/292 174/110 R |
| 6,392,153 | B1 * | 5/2002 | Horwatt | H01B 7/295 174/110 R |
| 6,683,256 | B2 * | 1/2004 | Kao | B32B 1/08 174/110 R |
| 6,989,198 | B2 * | 1/2006 | Masuda et al. | 428/474.9 |
| 7,005,583 | B2 * | 2/2006 | Varkey | H01B 3/441 174/120 R |
| 7,217,886 | B2 * | 5/2007 | Mhetar | H01B 3/427 174/110 R |
| 7,220,916 | B2 * | 5/2007 | Schwamborn et al. | 174/110 R |
| 7,696,437 | B2 * | 4/2010 | Clark | H01B 7/0216 174/110 R |
| 2003/0006058 | A1 * | 1/2003 | Yamamoto | H01B 7/0807 174/106 R |
| 2003/0019657 | A1 * | 1/2003 | Seigerschmidt | 174/113 C |
| 2003/0228434 | A1 * | 12/2003 | Bailey et al. | 428/36.91 |
| 2004/0069524 | A1 * | 4/2004 | Beauchamp | H01B 3/445 174/110 R |
| 2005/0013998 | A1 | 1/2005 | Lacourt | |
| 2005/0202242 | A1 * | 9/2005 | Favereau | H01B 3/445 428/375 |
| 2007/0224886 | A1 * | 9/2007 | Rodway | H01B 3/10 439/607.41 |
| 2008/0187759 | A1 * | 8/2008 | Fukuda et al. | 428/411.1 |
| 2009/0297858 | A1 * | 12/2009 | Glenn | B32B 27/08 428/421 |
| 2010/0197869 | A1 * | 8/2010 | Tonelli | 525/420 |
| 2010/0218974 | A1 * | 9/2010 | Mehan | H01B 7/0216 174/120 SR |
| 2010/0218975 | A1 * | 9/2010 | Mehan | H01B 7/0225 174/120 SR |
| 2010/0219555 | A1 * | 9/2010 | Mehan | B29C 47/0023 264/173.12 |

FOREIGN PATENT DOCUMENTS

| | | |
|---|---|---|
| WO | 2010 098847 A1 | 9/2010 |
| WO | 2010 099845 A1 | 9/2010 |

OTHER PUBLICATIONS

Macromolecules 1993, 26, 3713-3716 3713 Processible Poly(arylene ether ketone)s That Can Be Cross-Linked to High-Performance Networks Kenneth A. Walker, Larry J. Markoski, and Jeffrey S. Moore.*

International Search Report, International Application No. PCT/US2014/010304, International Filing Date, Jan. 6, 2014.

* cited by examiner ature of the present invention
MULTI-LAYER INSULATED CONDUCTOR HAVING IMPROVED SCRAPE ABRASION RESISTANCE

FIELD

This application is directed to insulated electrical conductors and more particularly to a multi-layer insulated conductor that results in improved resistance to scrape abrasion.

BACKGROUND

Electrically insulated wires are often used in environments in which the physical, mechanical, electrical and thermal properties of the insulation are put to the test by extreme conditions. Resistance to failure by mechanical abrasion of the insulation remains an important performance requirement for primary wires, particularly in aerospace applications.

However, as these applications drive toward increasingly higher performance standards, size and weight form a significant part of overall design requirements of wires and cables used in those applications. Thus, while increased insulation thicknesses can provide greater mechanical abrasion resistance, the additional insulation volume adds weight as well as increases stiffness, making the wires and cables more difficult to manipulate. However, decreasing the total insulation thickness to reduce weight and size are traditionally associated with a decrease in abrasion resistance.

These and other drawbacks are found in current insulated conductors.

SUMMARY

Exemplary embodiments are directed to a multi-layer insulated conductor that combines a high modulus layer with a solid lubricant layer having low surface energy that unexpectedly and synergistically exhibits improved scrape abrasion resistance while retaining a size and weight that allows the conductor to be used in a broad range of applications, including aerospace applications.

According to an exemplary embodiment of the invention, an insulated conductor is disclosed. The insulated conductor includes an elongate conductor and a multi-layer insulation system having an extruded first insulating layer comprising an aromatic thermoplastic material overlying the elongate conductor and an extruded second insulating layer comprising a perfluoropolymer in contact with the first insulating layer. The first and second insulating layers are each of a wall thickness such that the multi-layer insulation system exhibits a scrape abrasion resistance that is significantly greater than the sum of the scrape abrasion resistance of the first and second insulating layers individually at that thickness.

In one presently preferred embodiment, the insulated conductor is an elongate conductor and a two-layer insulation system having an extruded first insulating layer comprising PEEK overlying the elongate conductor and having an average wall thickness of about 0.003 inches and an extruded second insulating layer comprising PTFE overlying and in contact with the first insulating layer and having an average wall thickness of about 0.003 inches.

In another presently preferred embodiment, the insulated conductor is an elongate conductor comprising a braided cable and a two-layer insulation system having an extruded first insulating layer comprising annealed PEEK overlying the elongate conductor and having an average wall thickness of about 0.0055 inches and an extruded second insulating layer comprising FEP overlying and in contact with the first insulating layer and having an average wall thickness of about 0.0085 inches.

An advantage of certain exemplary embodiments of the invention includes that an insulated conductor is provided that has a durable, low weight insulation system.

Another advantage of certain exemplary embodiments of the invention includes that the multi-layer insulated conductor unexpectedly achieves improved scrape abrasion resistance with the combination of these layers which is significantly greater than the additive individual contributions that would be expected from employing those individual layers in combination.

Other features and advantages of the present invention will be apparent from the following more detailed description of exemplary embodiments, taken in conjunction with the accompanying drawings which illustrate, by way of example, the principles of the invention.

BRIEF DESCRIPTION OF THE DRAWINGS

Where like parts appear in more than one drawing, it has been attempted to use like reference numerals for clarity.

DETAILED DESCRIPTION OF EXEMPLARY EMBODIMENTS

Figure 1:
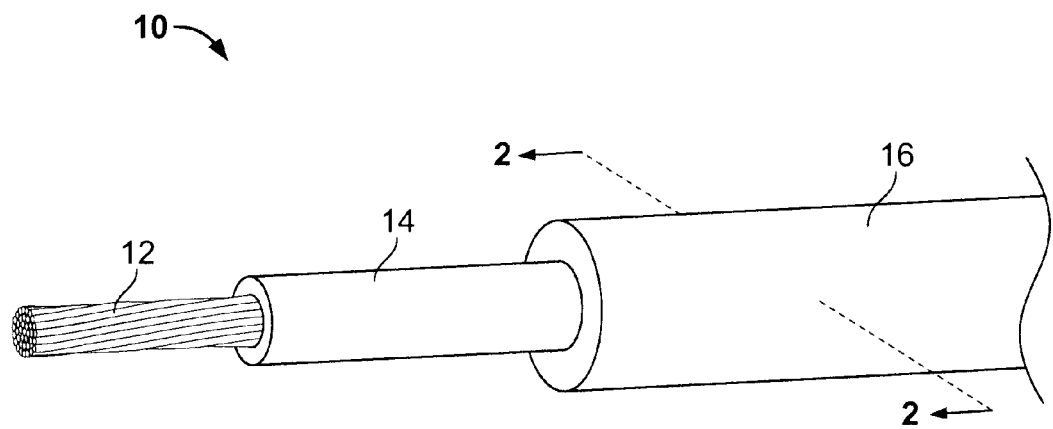
FIG. 1 illustrates a perspective view of an insulated conductor in accordance with an exemplary embodiment of the invention with partial removal of the insulating layers.
Figure 3:
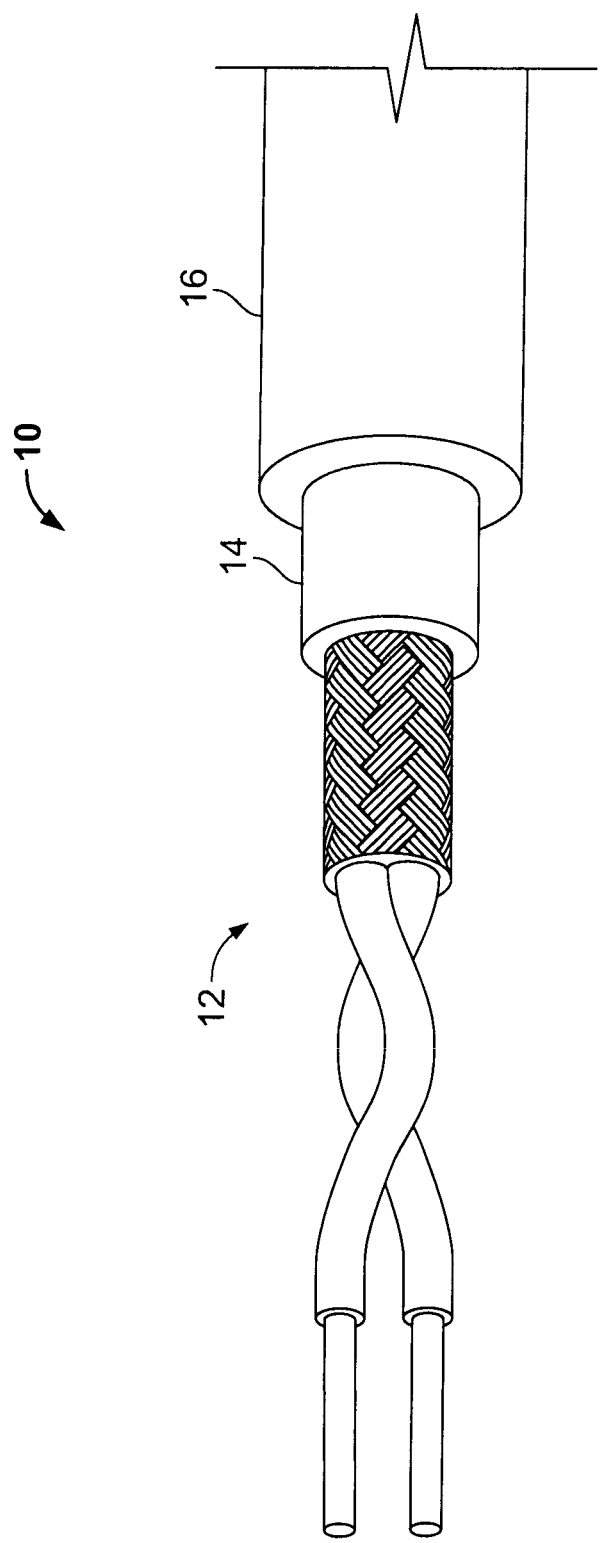
FIG. 3 illustrates a side view of an insulated conductor in accordance with an exemplary embodiment of the invention with partial removal of the insulating layers in which the conductor is a braided cable.

Turning to FIG. 1, exemplary embodiments of the invention are directed to an insulated conductor 10 that includes an elongate conductor 12 and an insulating system having a first insulating layer 14 and a second insulating layer 16. Although described primarily herein with respect to primary wires in which the elongate conductor 12 is a single or multi-stranded conductor, it will be appreciated that the insulated conductor 10 can also be a braided cable or other bundle of wires. In embodiments in which the elongate conductor 12 is a cable, the wires making up the cable may or may not already be insulated and/or shielded and, if insulated, each of the individual wires may independently employ a conventional insulation or an insulating system in accordance with exemplary embodiments. In the case of a cable, the first and second insulating layers 14, 16 thus coat the entire braided bundle of wires to form the insulated conductor 10, as seen in FIG. 3.

Figure 2:
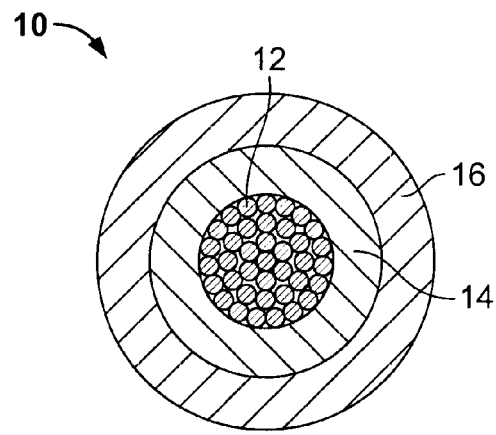
FIG. 2 illustrates a cross-sectional view of the insulated conductor of FIG. 1 along line 2-2.

The elongate conductor 12 may be a wire of any suitable gauge and may be solid or stranded (i.e., made up of many smaller wires twisted together). FIG. 2 illustrates a cross-sectional view of the insulated conductor shown in FIG. 1 in which the elongate conductor 12 is a stranded conductor, which is preferred for applications in aircraft or other settings in which the conductor will be subject to vibration. The conductor 12 is generally copper or another metal, such as copper alloy or aluminum. If pure copper is used, it may be coated with tin, silver, nickel or other metal to reduce oxidation and improve solderability. Stranded conductors may be of the unilay, concentric or other type. The conductor preferably has a diameter in the range from between about 0.204 inches (about 5.18 mm) to about 0.016 inches (about 0.40 mm) for solid conductors, or a diameter in the range from between about 0.232 inches (about 5.89 mm) to about 0.019 inches (about 0.48 mm) for stranded conductors, which correspond to standard dimensions for 4 AWG to 26 AWG wires. Conductors of 4 AWG, 6 AWG, 8 AWG, 10 AWG, 12 AWG, 14 AWG, 16 AWG, 18 AWG, 20 AWG, 22 AWG, 24 AWG, and/or 26 AWG are typical.

The first insulating layer 14 overlies and is adjacent the elongate conductor 12. The first insulating layer 14 is comprised of an extruded aromatic thermoplastic material. The first insulating layer 14 may be applied by any suitable extrusion technique, such as tube extrusion, for example. As will be appreciated, tube extrusion refers to a technique in which the material being extruded is contacted to the surface to which it is being applied outside the extruder die, while pressure extrusion refers to a technique in which the material being extruded is contacted to the surface to which it is being applied while it is still within the extruder die.

The material selected for the first insulating layer 14, which may in some cases be the inner or core layer, is an aromatic thermoplastic material selected to have a very high tensile modulus (as measured according to ASTM D638) both at room temperature and at elevated temperature. More particularly, the first insulating layer may be a polyaryleneetherketone or blend containing one or more compounds from that polyketone family; exemplary such materials include polyetheretherketone (PEEK), polyetherketoneketone (PEKK), and polyetherketone (PEK), polyetherimide (PEI), and blends thereof. Preferably, the first insulating layer 14 includes PEEK. In some embodiments, the aromatic material used for the first insulating layer 14 may be annealed.

The second insulating layer 16 is in contact with the first insulating layer 14. Like the first insulating layer 14, the second insulating layer 16 is also extruded to provide a substantially uniform thickness along its length, which results in a smooth outer surface. Like the first insulating layer 14, the second insulating layer 16 may be applied by tube or pressure extruding techniques. The second insulating layer 16 comprises a material having a low surface energy, such as a perfluoropolymer, including perfluoroalkoxy polymers (PFA), fluorinated ethylene propylene polymers (FEP), polytetrafluoroethylene (PTFE), perfluoromethylalkoxy polymers (MFA), perfluorinated polyethers (PFPE), polychlorotrifluoroethylene (PCTFE) and blends thereof. In a preferred embodiment, the perfluoropolymer of the second insulating layer is PTFE or FEP.

It will further be appreciated that the results can also be achieved if the perfluoropolymer is applied as the first insulating layer 14 and the aromatic thermoplastic is applied as the second insulating layer 16 (i.e., overlying the first insulating layer 14).

It has been determined that an insulation system that is the combination of a layer of an aromatic polymer having a high modulus, such as PEEK, and a thin layer of a perfluoropolymer, such as PTFE, applied in any order, provides a surprising and unexpected increase in scrape abrasion resistance that is much greater than the additive effects the two layers would be expected to provide individually at the same total thickness. In some cases, the multi-layer insulation system in accordance with exemplary embodiments exhibits a scrape abrasion resistance that is more than 50% greater than the sum of the scrape abrasion resistance of the first and second insulating layers individually at that thickness, and in certain cases, more than 100% greater, with some embodiments exhibit one to two orders of magnitude increases.

By "scrape abrasion resistance" is meant the resistance to erosion of the insulative coating when its outer surface is repeatedly scraped or rubbed, which is customarily measured by a needle abrasion test in which a needle having a predetermined diameter is scraped a predetermined length across the insulated conductor under a predetermined load at a rate of a predetermined number of strokes per minute. Any customary needle abrasion test used in accordance with industry standards may be employed, the most widely accepted being European Standard EN 3475, Part 503.

May be measured by a any customary needle scrape. Without wishing to be bound by theory, it is believed that the perfluoropolymer provides a hydrodynamic lubrication if a minimum thickness of the aromatic polymer has been applied. This leads to the ability to form primary wires, cables and other forms of insulated conductors with outer jackets that have superior abrasion resistance while maintaining thin walls and light weights.

That is, while abrasion resistance could also be improved by providing a coating of a single thick layer of the high modulus material, the wire would become too stiff. Exemplary embodiments achieve excellent abrasion resistance by providing a two layer system while minimizing the thickness of the high modulus layer and maintain flexibility in the wire, cable or other conductor employing that system, provided a certain minimum thickness for the high modulus layer is still met.

In addition to the polymeric constituents of the first and second insulating layers, each of the layers may include any conventional constituents for wire insulation such as antioxidants, UV stabilizers, pigments or other coloring or opacifying agents, and/or flame retardants.

The thicknesses of the insulating layers 14, 16 to achieve the synergistic effects in scrape abrasion seen in exemplary embodiments (as measured by European Standard EN 3475, Part 503—"Needle Abrasion Test"—incorporated by reference in its entirety and described subsequently in more detail), and in particular the minimum average wall thickness of the first insulating layer 14 (i.e. the high modulus layer), will vary depending upon a variety of factors, including the thickness of the elongate conductor 12 to which they are applied. For example, in embodiments employing a 20 AWG single stranded wire or a 12 AWG multi-stranded wire, the high modulus layer has an average wall thickness of at least about 0.003 inches (about 0.076 mm) and the perfluoropolymer layer has an average wall thickness of less than about 0.004 inches (about 0.102 mm), typically in the range from about 0.002 inches (about 0.050 mm) to about 0.004 inches (about 0.100 mm).

In another embodiment employing 8 AWG, the minimum average wall thickness of the high modulus layer is about 0.004 inches (about 0.102 mm) to achieve synergistic effects, while the perfluoropolymer layer may have an average wall thickness of less than about 0.004 inches (about 0.102 mm), typically in the range from about 0.002 inches (about 0.050 mm) to about 0.004 inches (about 0.100 mm).

In embodiments employing a braided cable, the minimum average wall thickness of the high modulus layer is about 0.0055 inches (about 0.140 mm) to achieve synergistic effects, while the perfluoropolymer layer may have an average wall thickness of less than about 0.010 inches (about 0.25 mm), and in one embodiment is about 0.0085 inches (about 0.216 mm). Those skilled in the design of wire and cables will appreciate the need for an increase in overall wall thickness of the jacket with larger cable diameters to minimize "wrinkling" issues with very thin layers that may be in greater than the minimum thickness to achieve the scrape abrasion performance described herein.

EXAMPLES

The invention is further described with respect to the following examples, which are presented by way of illustration and not of limitation.

Example 1

A 20 AWG concentrically stranded conductor having an outer diameter of 0.0371 inches of soft annealed copper was tin plated. PEEK, obtained as PEEK 450G from Victrex Corporation, was dried at 160° C. in an air circulating oven for 24 hours immediately prior to extrusion. The PEEK was tube extruded over the conductor using an extruder barrel length to inside diameter (L/D) ratio of 24:1 to an average thickness of 0.003 inches.

A layer of PTFE (Moldflon MF100005 from Elring-Klinger) was then extruded over the PEEK to a thickness of 0.003 inches, followed by annealing at 170° C. for one hour.

Example 2

A second insulated conductor was constructed in an identical manner as Example 1 and having the same overall wall thickness, except that the PEEK was extruded to a thickness of 0.002 inches and the PTFE was extruded to a thickness of 0.004 inches.

Comparative Example 1

A first comparative example was otherwise constructed in an identical manner to Example 1, except that no second insulating layer was applied, resulting in a conductor having only the 0.003 inch layer of PEEK.

Comparative Example 2

A second comparative example was otherwise constructed in an identical manner to Example 2, except that no second insulating layer was applied, resulting in a conductor having only the 0.002 inches layer of PEEK.

Comparative Example 3

A third comparative example was formed in a similar manner using the same base conductor in the other examples, except that the entire insulative coating was a 0.0066 inch thick layer of PTFE.

All of the examples were then tested in accordance with the scrape abrasion test as described in European Standard EN 3475, Part 503 ("Needle Abrasion Test"), which is hereby incorporated by reference in its entirety. Briefly, in this test, a metallic round needle having a diameter of 20 mils is scraped repeatedly over the upper surface of the coated wire. The longitudinal axis of the needle and the specimen are kept at right angles to each other. A weight affixed to a jig above the needle controls the weight normal to the surface of the insulation. The weight is a load of 500 grams (about 4.9 Newtons or about 1.1 pounds) applied to the head holding the needle. A motor-driven, reciprocating cam mechanism and counter is used to move a sample back and forth for delivering abrading strokes in a direction parallel to the axis of the specimen. The length of the stroke is 0.394 inches (10 mm) and the frequency of the stroke is 110 strokes (55 stroking cycles) per minute.

Six runs for each wire were conducted with the average number of cycles to failure reported in Table 1 below.

TABLE 1

| Sample Description | Average Cycles to Failure | Insulation Weight (g) |
|---|---|---|
| Ex. 1 | 7983 | 0.600 |
| Ex. 2 | 113 | 0.631 |
| Comp. Ex. 1 | 2148 | 0.191 |
| Comp. Ex. 2 | 11 | 0.129 |
| Comp. Ex. 3 | 219 | 0.793 |

Example 1 reflects that a 1:1 ratio of PEEK to PTFE resulted in a significant increase in the number of cycles over PEEK alone (Comparative Example 1) which was half the thickness. That represents a gain of 4759 cycles that comes only from the addition of the outer layer of PTFE; however, one would expect the outer layer of PTFE to result in an additive effect of no more than 200 cycles, as Comparative Example 3 reflects that the conductor coated entirely of PTFE to a 6.6 mil outer wall thickness results in a total cycles-to-failure of slightly more than 200 cycles.

The observed increase of over a 370% increase in the number of cycles is synergistic and unexpected compared to the additive effects that would be expected from the independent elements alone as Comparative Examples 1 and 3 reflect.

Example 2 reflects that a minimum thickness of PEEK is need to achieve the synergistic result, although it still exhibited a significant increase over Comparative Example 2, which was PEEK alone at the same 0.002 inch thickness.

To determine the minimum thickness, the experiment was repeated in which the PEEK wall thickness was increased incrementally from 0.002 inches to 0.003 inches, while maintaining the same thickness in the outer, PTFE layer, the results of which are shown in Table 2 and reflect that to gain a particularly significant number of cycles to failure, the PEEK wall thickness should be at least 0.003 inches.

TABLE 2

| Wall Thickness of PEEK layer | Average Cycles to Failure Without Outer Lubricating Layer | Average Cycles to Failure With Outer Lubricating Layer |
|---|---|---|
| 0.0020 in. | 11 | 113 |
| 0.0025 in. | 64 | 503 |
| 0.0030 in. | 1721 | 7983 |

Example 3

12 AWG conductors were constructed from 37 strands of 28 AWG nickel plated copper, then coated with 0.003 inches of PEEK followed by 0.003 inches PTFE (as Moldflon 10010). Both annealed and unannealed samples were created and subjected to the needle abrasion test discussed above. Comparative Examples were also created by evaluating wires from which the outer PTFE jacket was removed, leaving only the 0.003 inch layer of PEEK. The results are reflected in Table 3.

TABLE 3

| Insulation System on 12 AWG stranded conductor | Average Cycles to Failure |
|---|---|
| 0.003 in. PEEK/0.003 in. PTFE (unannealed PEEK) | 8535 |
| 0.003 in. PEEK (unannealed PEEK) | 1972 |
| 0.003 in. PEEK/0.003 in. PTFE (annealed PEEK) | 69379 |
| 0.003 in. PEEK (annealed PEEK) | 2243 |
| 0.006 in. PTFE | 1323 |

In this example, the exemplary insulating system containing the annealed PEEK exhibited more than an order of magnitude increase, while even the exemplary system containing unannealed PEEK exhibited significantly higher and unexpected results, as the additive effects of the individual contributions of the PTFE and PEEK are dwarfed by the effects seen in combination.

Example 4

In another example, 8 AWG nickel plated copper conductors were provided. The conductors were coated with increasing increments of 0.003 inches of PEEK up to 0.004 inches of PEEK, followed in each case by 0.004 inches PTFE (as Moldflon). Both annealed and unannealed samples were created and subjected to the needle abrasion test discussed above, except that a heavier load of 816 g was employed. The results are shown in Tables 4a and 4b, which reflects a minimum thickness of 0.004 inches for the heavier wire and under the heavier scrape abrasion condition for each of the annealed and unannealed samples.

TABLE 4a with unannealed PEEK

| Wall Thickness of PEEK layer | Average Cycles to Failure Without Outer Lubricating Layer | Average Cycles to Failure With Outer Lubricating Layer |
|---|---|---|
| 0.0030 in. | 11 | 336 |
| 0.0035 in. | 120 | 831 |
| 0.0040 in. | 2207 | 5153 |

TABLE 4b with annealed PEEK

| Wall Thickness of PEEK layer | Average Cycles to Failure Without Outer Lubricating Layer | Average Cycles to Failure With Outer Lubricating Layer |
|---|---|---|
| 0.0030 in. | 14 | 351 |
| 0.0035 in. | 137 | 1026 |
| 0.0040 in. | 1139 | 5867 |

Example 5

Another example was performed using an 8 AWG conductor, in which a tin plated copper conductor was provided, with the insulation system identified next to results shown below in Table 5 in which the exemplary embodiments were formed using unannealed PEEK and PTFE (as Moldflon). In this example, an even heavier load (1223 g) was used for the needle scrape test, which reflects significant synergistic gains, even at higher loads which might be expected to show less difference between the samples.

TABLE 3

| Insulation System | Average Cycles to Failure |
|---|---|
| 0.00425 in. PEEK/0.00675 in. PTFE | 284 |
| 0.006 in. PEEK/0.005 in. PTFE | 1258 |
| 0.00425 in. PEEK | 13 |
| 0.0006 in. PEEK | 377 |
| 0.00675 in. PTFE | 1 |

Example 6

In another example, an 8 AWG twisted cable conductor was provided, again tested in the same manner as previously described but using a load of 1223 g. In this example, the order of the first and second insulating layers was reversed, with the lubricating layer applied underneath the high modulus PEEK layer (this time employing 4000G from Victrex). In this example, both PTFE (as Moldflon MF10010) and FEP (as Teflon FEP-100) were used as perfluoropolymer lubricating layers. Both annealed and unannealed samples were evaluated, with annealing carried out at 180° C. for 1 hour. Results are shown in Table 6.

TABLE 6

| Insulation System on 8 AWG TC conductor | Average Cycles to Failure |
|---|---|
| 0.00425 in. PTFE/0.00425 in. PEEK (unannealed PEEK) | 744 |
| 0.00675 in. PTFE/0.00425 in. PEEK (unannealed PEEK) | 7523 |
| 0.00675 in. FEP/0.00425 in. PEEK (unannealed PEEK) | 15137 |
| 0.00425 in. PTFE/0.00425 in. PEEK (annealed PEEK) | 2234 |
| 0.00675 in. PTFE/0.00425 in. PEEK (annealed PEEK) | 13808 |
| 0.00675 in. FEP/0.00425 in. PEEK (annealed PEEK) | 13683 |
| 0.00425 in. PTFE | 0.5 |
| 0.00675 in. PTFE | 1.3 |
| 0.00675 in. FEP | 3 |
| 0.00425 in. PEEK (unannealed) | 13 |

Example 7

In this example, an 8 AWG twisted conductor containing 37 wrapped bundles was formed, each bundle containing 7 strands of 32 AWG nickel-plated copper. An insulating system in accordance with exemplary embodiments of 0.004 inches PEEK overlaid by 0.004 inches PTFE (as Moldflon 10010) was applied to samples in both annealed and non-annealed embodiments. The conductor was subjected to the needle scrape test as described above, this time using a 816 gram load. For comparison, conductors separately coated only with PEEK or only with PTFE were also examined. The results are shown in Table 7.

TABLE 7

| Insulation System on 8 AWG TC conductor | Average Cycles to Failure |
| --- | --- |
| 0.0040 in. PEEK/0.004 in. PTFE (unannealed PEEK) | 5153 |
| 0.0040 in. PEEK/0.004 in. PTFE (annealed PEEK) | 5867 |
| 0.0040 in. PEEK (unannealed) | 2207 |
| 0.0040 in. PEEK (annealed) | 1139 |
| 0.004 in. PTFE | 26 |

As with other inventive insulating systems exemplified herein, the insulating system of this example again showed a synergistic, unexpected improvement in scrape abrasion resistance that far exceeds what would have been expected from the additive effects of either of the components employed alone. Further, the results are seen in both annealed and unannealed samples, although the improvement in the annealed samples reflects a larger total gain.

Example 8

In this example, the insulating system was used as a jacket for a braided cable in which a braided cable was overlain by PEEK, followed by FEP (Teflon FEP-1000J). As in several of the other examples, the PEEK was evaluated in both annealed and unannealed form, along with single system jackets of PEEK and FEP individually for comparison. The needle scrape test was conducted using a 1224 gram load. The results of this example are reflected in Table 8.

TABLE 8

| Insulation System on Braided Conductor | Average Cycles to Failure |
| --- | --- |
| 0.0055 in. PEEK/0.0085 in. FEP (unannealed PEEK) | 33943 |
| 0.0055 in. PEEK/0.0085 in. FEP (annealed PEEK) | 131751 |
| 0.0055 in. PEEK (unannealed) | 10512 |
| 0.0055 in. PEEK (annealed) | 7980 |
| 0.014 in. FEP | 1403 |

In this example, the use of the inventive insulating system reflected an extraordinary gain in scrape abrasion performance, particularly when annealed PEEK was used, with an increase of over two orders of magnitude.

While the foregoing specification illustrates and describes exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An insulated conductor comprising:
an elongate conductor; and
a multi-layer insulation system having
an extruded first insulating layer comprising an aromatic thermoplastic material overlying the elongate conductor; and
an extruded second insulating layer comprising a perfluoropolymer in contact with the first insulating layer, wherein the first and second insulating layers are each of a wall thickness such that the multi-layer insulation system exhibits a scrape abrasion resistance that is at least 50% greater than the sum of the scrape abrasion resistance of the first and second insulating layers individually at that thickness when the scrape abrasion resistance is measured in accordance with a predetermined needle abrasion test.

2. The insulated conductor of claim 1, wherein the first insulating layer has an average wall thickness in the range of about 0.003 inches to about 0.006 inches.

3. The insulated conductor of claim 1, wherein the second insulating layer has an average wall thickness in the range of about 0.002 inches to about 0.009 inches.

4. The insulated conductor of claim 1, wherein the first insulating layer comprises a polyaryleneetherketone.

5. The insulated conductor of claim 4, wherein the polyaryleneetherketone is selected from the group consisting of polyetheretherketone (PEEK), polyetherketoneketone (PEKK), polyetherketone (PEK), polyetherimide (PEI), and blends thereof.

6. The insulated conductor of claim 1, wherein the first insulating layer comprises PEEK.

7. The insulated conductor of claim 1, wherein the perfluoropolymer comprises a compound selected from the group consisting of perfluoroalkoxy polymers (PFA), fluorinated ethylene propylene polymers (FEP), polytetrafluoroethylene (PTFE), perfluoromethylalkoxy polymers (MFA), perfluorinated polyethers (PFPE), polychlorotrifluoroethylene (PCTFE) and blends thereof.

8. The insulated conductor of claim 1, wherein the second insulating layer comprises PTFE or FEP.

9. The insulated conductor of claim 1, wherein the first insulating layer comprises PEEK and the second insulating layer comprises PTFE or FEP.

10. The insulated conductor of claim 9, wherein the first insulating layer has an average wall thickness of about 0.003 inches and the second insulating layer has an average wall thickness of about 0.003 inches.

11. The insulated conductor of claim 10, wherein the second insulating layer overlies the first insulating layer.

12. The insulated conductor of claim 1, wherein the elongate conductor is a stranded conductor.

13. The insulated conductor claim 1, wherein the elongate conductor is a braided cable.

14. The insulated conductor of claim 1, wherein the first insulating layer is annealed.

15. The insulated conductor of claim 1, wherein the predetermined needle abrasion test employs a needle having a diameter scraped a length across the insulated conductor under a load at a rate of a number of strokes per minute.

16. The insulated conductor of claim 15, wherein the needle diameter is 0.020 inches, the stroke length is 0.394 inches, the rate is 110 strokes per minute and the load is 1.1 pounds.

17. The insulated conductor of claim 16, wherein the multi-layer insulation system exhibits a scrape abrasion resistance that is at least 100% greater than the sum of the scrape abrasion resistance of the first and second insulating layers individually at that thickness.

18. An insulated conductor comprising:
an elongate conductor; and
a two-layer insulation system having an extruded first insulating layer comprising PEEK overlying the elongate conductor and having an average wall thickness of about 0.003 inches; and an extruded second insulating layer comprising PTFE overlying and in contact with the first insulating layer and having an average wall thickness of about 0.003 inches.

19. An insulated conductor comprising:

an elongate conductor comprising a braided cable; and a two-layer insulation system having an extruded first insulating layer comprising annealed PEEK overlying the elongate conductor and having an average wall thickness of about 0.0055 inches; and an extruded second insulating layer comprising FEP overlying and in contact with the first insulating layer and having an average wall thickness of about 0.0085 inches.

* * * * *